United States Patent [19]
Hunter

[11] 3,993,600
[45] *Nov. 23, 1976

[54] CATALYST SUPPORT ASSEMBLY

[75] Inventor: James B. Hunter, Newton Square, Pa.

[73] Assignee: Matthey Bishop, Inc., Malvern, Pa.

[ * ] Notice: The portion of the term of this patent subsequent to Dec. 4, 1990, has been disclaimed.

[22] Filed: Apr. 17, 1975

[21] Appl. No.: 568,943

Related U.S. Application Data

[63] Continuation-in-part of Ser. No. 383,103, Aug. 23, 1973, Pat. No. 3,881,877, which is a continuation-in-part of Ser. No. 186,630, Oct. 5, 1971, Pat. No. 3,776,701.

[52] U.S. Cl. ............................. 252/465; 23/288 R; 55/524; 55/526; 252/477 R
[51] Int. Cl.² .................... B01J 23/16; B01J 23/42; B01J 35/04
[58] Field of Search ......... 23/288 R, 288 F, 288 FB; 55/526, 524, 525; 423/392; 252/477 R, 465

[56] References Cited
UNITED STATES PATENTS

| | | | |
|---|---|---|---|
| 1,927,963 | 8/1932 | Taylor | 252/477 R |
| 2,517,209 | 8/1950 | Jackson et al. | 23/288 F |
| 2,747,679 | 5/1956 | Ruthardt | 252/477 R |
| 3,135,703 | 6/1964 | Sill | 252/477 R |
| 3,434,826 | 3/1969 | Holzmann | 23/288 R |
| 3,776,701 | 12/1973 | Hunter | 23/288 R |
| 3,874,645 | 4/1975 | Aguinet et al. | 23/288 R |
| 3,881,877 | 5/1975 | Hunter | 23/288 R |

FOREIGN PATENTS OR APPLICATIONS

| | | |
|---|---|---|
| 75,625 | 1949 | Norway |

OTHER PUBLICATIONS

Merriman; "A Dictionary of Metallury"; p. 158, 1958.
"Nitric Acid Rolls On"; Chem. Engr.; 6–29–70; p. 24.

*Primary Examiner*—Morris O. Wolk
*Assistant Examiner*—Bradley R. Garris
*Attorney, Agent, or Firm*—Cushman, Darby & Cushman

[57] ABSTRACT

A catalyst supporting structure comprising a plurality of catalytically active woven screens in a stacked relationship, the screens consisting essentially of a catalytically active alloy of iron, chromium, cobalt and aluminum.

4 Claims, 3 Drawing Figures

CATALYST SUPPORT ASSEMBLY

The present application is a continuation-in-part of Ser. No. 383,103, filed Aug. 23, 1973, now U.S. Pat. No. 3,881,877, which is itself a continuation-in-part of Ser. No. 186,630, filed Oct. 5, 1971, now U.S. Pat. No. 3,776,701.

The present invention relates to certain improvements in nonprecious metal supports for use with precious metal catalyst gauze or the like.

In numerous types of chemical processes involving a catalyzed reaction of gaseous reactants, it is desirable to support catalyst gauze by means which will permit gaseous reactants to pass through the catalyst and its support at elevated temperatures and pressures. For example, in the oxidation of ammonia in the preparation of nitric acid, ammonia and oxygen are passed through a precious metal catalyst gauze supported on nichrome bars and heavy mesh screen (see, for example, U.S. Pat. No. 3,195,988). Nichrome screens or the like have also been proposed for use as catalyst supports and it has been suggested that such screens may be used to replace some of the precious metal gauze for ammonia oxidation (see Norwegian Pat. No. 75625).

A similar proposal for reducing the amount of precious metal gauze used for ammonia oxidation is shown in U.S. Pat. No. 3,660,024 where a randomly oriented knitted pad of nonprecious metal is used to support the gauze.

The present invention constitutes a unique improvement over the catalyst support and process described in Norwegian Pat. No. 75625. More specifically, the invention is dependent on the use of a special type of nonprecious metal woven screen support for the precious metal gauze used in ammonia oxidation or equivalent processes.

Broadly stated, the support of the invention comprises a plurality of essentially identical woven screens in stacked relationship and made of a specific heat resistant alloy consisting essentially of aluminum, chromium, cobalt and iron. The screens are advantageously laid directly on each other and preferably are spot welded at various points to provide an integral assembly for ease in handling.

It has been found that screens having the alloy composition of the invention are remarkably effective to support catalyst gauze in, for example, ammonia oxidation processes. Surprisingly, the alloy itself appears to demonstrate a marked catalytic effect. This is evidenced by the fact that higher yields are obtained and the catalyst gauze supported thereby can be used for longer periods of time without reduction in conversion efficiency, than is possible using other types of supports, e.g. nichrome, inconel and stainless steel. The support is most effectively used to reduce the number of precious metal catalyst gauzes although the support can also be employed with a full complement of gauze.

The success of the invention, using knitted screens of the indicated alloy, is quite unexpected, particularly in view of the teaching in U.S. Pat. No. 3,660,024 that the use of knitted screens for gauze replacement results in catastrophic failure.

A particularly useful alloy composition for use in making the screens of the invention is available as "Kanthal". This alloy is understood to have the following composition, percentages being by weight:

4.5% aluminum
22.0% chromium
0.5% cobalt
balance essentially iron

It will be recognized that the alloy composition described above is given only as an example. Broadly described, the alloy used herein may consist essentially of about 20–30% chromium, about 4–6% aluminum, about 0.25–1% cobalt, balance essentially iron with the optional presence of not more than 1% silicon, molybdenum, manganese or the like.

The unobviousness of the invention is especially emphasized by the fact that so-called "Megapyr" alloy compositions comprising about 5% aluminum, 22–25% chromium, less than 1% each of silicon and manganese, balance essentially iron while suitable as a support for precious metal gauze or as a replacement therefor and generally considered equivalent to "Kanthal" alloy in this regard, do not demonstrate any catalytic effect when used with precious metal gauze in ammonia oxidation.

Typically the woven sheets used herein are "Kanthal" screens of 80 mesh or coarser (U.S. Sieve). Particularly useful results have been obtained with 18–30 mesh woven screens (e.g. 18 mesh, 0.016 inch diameter wire or 30 mesh, 0.008 inch diameter wire).

The invention is hereinafter described in more detail by reference to the accompanying drawings, wherein.

Figure 1:
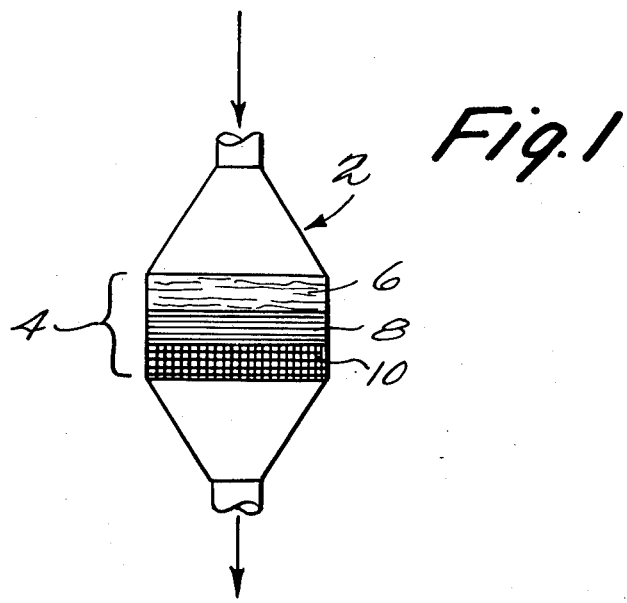
FIG. 1 is a vertical sectional view of a catalytic reactor showing the manner in which a catalyst supporting structure according to this invention may be used.

Referring more specifically to the drawings, a typical way of using a catalyst supporting structure according to this invention is shown in FIG. 1 wherein 2 represents a reactor which, for purposes of illustration, may be a conventional type ammonia oxidation burner, includng a catalyst package 4, through which a gaseous mixture of $NH_3$, $O_2$ and $N_2$ is fed, at elevated temperature and pressure. The catalyst package 4 comprises a woven gauze or pack of such gauzes 6 of platinum metal, preferably platinum/rhodium alloy. Typically the gauze or gauze pack comprises woven 80 mesh screen with 90% platinum/10% rhodium alloy wire 0.003 inch although different mesh sizes, wire compositions and the like may be used.

Preferably, but not necessarily, the catalyst package also comprises one or more screens 8 or the equivalent of a "getter" material, as described in U.S. Pat. No. 3,434,826. As shown, and as understood in the art, the getter is positioned just below the catalyst 6 and serves to collect platinum volatilized from the catalyst.

The supporting structure 10, constituting the essential aspect of the present invention, serves to support the catalyst 6 and getter 8 although it will be appreciated that in certain circumstances, the getter may be omitted.

Figure 2:
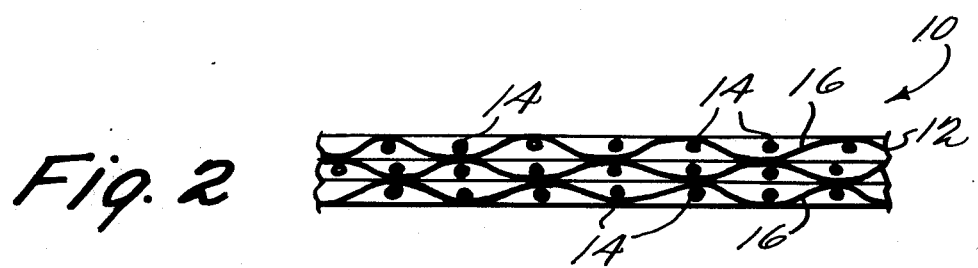
FIG. 2 is a vertical sectional view through the support of the invention.

As shown in FIG. 2, the structure 10 comprises a plurality of stacked woven screens 12 composed of woven wire elements 14 and 16 having the special alloy composition indicated earlier herein (e.g. "Kanthal" or other equivalent alloy). Typically, the screens are woven from 0.016 inch wire alloy and are 16–18 mesh (U.S. Sieve) although variations in mesh and wire size, e.g. 0.008 inch – 0.020 inch wire, give satisfactory results.

While FIG. 2 only shows a stack of three screens, it will be recognized that the number of screens so used can be varied depending on the use involved. For example, if the screens are used as partial replacements for precious metal gauze, e.g. gauze containing platinum, in ammonia oxidation, the number of screens will usually be selected to make up for the number or layers of gauze to be replaced in terms of overall thickness of the pack 4 or other operating factors.

Figure 3:
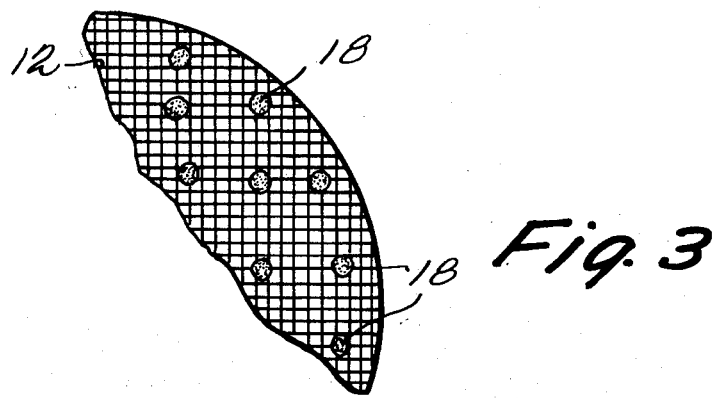
FIG. 3 is a fragmentary top plan view of the support.

FIG. 3 shows how the screens 12 may be spot welded as shown at 18 or otherwise joined together with the next adjacent screen to give a unitary or integral construction adapted for easy installation in conventional type ammonia oxidation reactors such as shown in FIG. 1 or the equivalent to provide a highly effective support for the catalytic gauze.

It will be appreciated that various modifications may be made in the invention described herein. A particularly important modification involves applying a catalytic coating on the screens themselves instead of using separate catalyst gauze supported by the screens. Thus, the screens can be platinized or otherwise processed in order to provide a separate catalytic coating thereon.

While the invention has been described above with particular reference to use of the screen structure for the catalytic oxidation of ammonia in the production of nitric acid, it will be recognized that the structure may be used in other types of reactions, such as the Andrussow hydrocyanic acid synthesis.

Various other modifications will also be apparent, the scope of the invention being defined in the following claims wherein:

What is claimed is:

1. In combination, a catalyst supporting structure comprising a plurality of woven screens in a stacked relationship, the screens being composed of an alloy consisting essentially of 4–6% aluminum, 20–30% chromium, 0.25–1% cobalt and balance essentially iron, and a plurality of precious metal catalyst gauzes supported on said structure, said alloy demonstrating a catalytic effect when used in said combination for ammonia oxidation.

2. The structure of claim 1 wherein said screens are bonded together to form a unitary assembly of said screens.

3. The structure of claim 1 wherein the screens are 80 mesh or coarser.

4. The structure of claim 3 wherein the screens are 18 – 30 mesh woven screens composed of about 0.008 inch – 0.016 inch wire.

* * * * *